United States Patent
Semple et al.

(10) Patent No.: US 8,099,676 B2
(45) Date of Patent: Jan. 17, 2012

(54) LOGON MANAGEMENT SOFTWARE, CONTROL DEVICE, AND LOGON MANAGEMENT METHOD

(75) Inventors: Gabriella Semple, Reading (GB); Yuan Shao, Sutton (GB); Perasiriyan Sivakumaran, Reading (GB)

(73) Assignee: Canon Europa N.V., Amstelveen (NL)

( * ) Notice: Subject to any disclaimer, the term of this patent is extended or adjusted under 35 U.S.C. 154(b) by 806 days.

(21) Appl. No.: 12/065,340

(22) PCT Filed: Aug. 30, 2006

(86) PCT No.: PCT/EP2006/065810
§ 371 (c)(1),
(2), (4) Date: Sep. 2, 2008

(87) PCT Pub. No.: WO2007/025982
PCT Pub. Date: Mar. 8, 2007

(65) Prior Publication Data
US 2008/0320390 A1    Dec. 25, 2008

(30) Foreign Application Priority Data
Aug. 31, 2005  (GB) .................................. 0517708.4

(51) Int. Cl.
G06F 3/048    (2006.01)
G06F 7/04     (2006.01)
G06F 3/041    (2006.01)
G09G 5/00     (2006.01)
H04N 1/00     (2006.01)

(52) U.S. Cl. .............. 715/773; 726/2; 726/27; 345/156; 345/168; 345/173

(58) Field of Classification Search .................. 715/773; 345/156, 168, 173; 358/305; 726/2, 27
See application file for complete search history.

(56) References Cited

U.S. PATENT DOCUMENTS
6,065,069 A    5/2000   Klein

FOREIGN PATENT DOCUMENTS
EP    0326102 A2    8/1989
WO    99/01859 A1   1/1999

OTHER PUBLICATIONS

Anonymous: "The Windows Interface Guidelines for Software Design" 1995, Microsoft Press, One Microsoft Way, Redmond, Washington, XP002433896 p. 381, paragraph 1-paragraph 2.
Anonymous: "Word Perfect screen shots" Screen Shot, Nov. 4, 1994, XP002433891 the whole document.

*Primary Examiner* — Ting Lee
(74) *Attorney, Agent, or Firm* — Canon USA Inc., IP Division

(57) ABSTRACT

A logon management software application is executed in a print control device (4) connectable to an information processing device (1), and performs the steps of: detecting if a hardware keyboard (38) is connected to the print control device during a logon process; displaying on a display (35) a first logon GUI for using the connected hardware keyboard if the connection of the hardware keyboard is detected; displaying on the display a second logon GUI, different to the first logon GUI, if the connection of the hardware keyboard is not detected; and controlling a logon of the print control device based on information entered into the first and/or second logon GUI dependent on whether the connection of the hardware keyboard is detected during at least part of the logon process.

11 Claims, 12 Drawing Sheets

FIG.12

Enter a user name and password and press the [Log In] key.

- User Name

| 111222 |

👆Touch the field to enter characters.

- Password

👆Touch the field to enter characters.

- Login Destination

| DEV |

Press the ID key after the operation is completed.

Log In

Remaining 2 A3 paper is low.   System Monitor

LOGON MANAGEMENT SOFTWARE, CONTROL DEVICE, AND LOGON MANAGEMENT METHOD

BACKGROUND OF THE INVENTION

1. Field of the Invention

The present invention relates to a control device connectable via a network to an information processing device that sends an instruction and data thereto, the information processing device being connectable via the network to the control device that receives an instruction and data therefrom. The invention also relates to a logon management method. The invention relates particularly, though not exclusively, to print control devices.

2. Description of the Related Art

MFPs (Multi Function Peripherals) connected to a network need to have enhanced security with a user authentication system, since MFPs are shared in an office and process much confidential information. MFPs have platform software as core software of the MFP, and execute a plurality of application software on the platform software. Recently MFP manufacturers provide a plurality of user authentication systems for the platform software of MFPs. The user authentication systems include Default Authentication functions, SDL (Simple Device Login) functions and SSO (Single Sign-On) function. The Default Authentication function requires an input of at least department ID and password for a user of the MFP to log into the MFP. The different department ID is allocated to each department in the office and its relationship is registered in the MFP. Therefore only persons who know the department ID and password can use the MFP. By using the Default Authentication function, the MFP administrator can manage the account of the user's usage in each department via the department ID.

The SDL function requires an input of at least a user name and password for a user of an MFP to log into (on) the MFP. An administrator of the MFP needs to register the user name and password into a hard disk of the MFP. Therefore only persons who know one's user name and password can use the MFP. Also, the SSO function requires an input of at least a user name and password for a user of an MFP to log into the MFP. The SSO function cooperates with a domain controller of a directory server on a network. The user name and password is used to log into network devices like personal computers (PCs) on the network. In order to use the SSO function, it is necessary to install a security application module into the PC. Therefore only persons who know one's username and password to be used in the PC can use the MFP. As described above, the current security systems of MFPs have a plurality of security functions with a different security level to log into the MFPs. The SSO function has the highest security level, the SDL function has intermediate security level and the Department ID (Default Authentication function) has the lowest security level.

Many varieties of USB (Universal Serial Bus) device go on sale in the world, USB memory, USB Keyboard and USB mouse etc. A user can connect the USB device to a USB connector of an information-processing device like a personal computer (PC) in an office and home.

When the user logs into an MFP using the user authentication systems, he or she enters at least his or her username and password using GUI (Graphical User Interface) displayed on a display of the MFP and a key unit located on the MFP. If the MFP displays a software keyboard (touch screen) on the display, the user enters his or her username and password by touching key on the displayed software keyboard. The username and password are controlled by a domain management system and maintained by the MFP administrator. However, it is not convenient for the user to enter the information in this way due to the limited size of the key unit or the software keyboard. Under this situation, the user hopes to connect his or her favorite USB keyboard (hardware keyboard) to the MFP in order to enter his or her username and password. Furthermore generally MFP administrators hope to connect a USB keyboard to an MFP in order to manage the MFP by inputting information, since MFPs have been computerized like PCs.

SUMMARY OF THE INVENTION

The present invention has been made in order to solve at least one of the problems described above. According to a first aspect of the present invention, there is provided a logon management software application as claimed in claims 1 to 10.

According to a second aspect of the present invention, there is provided a control device as claimed in claim 11.

According to a third aspect of the present invention, there is provided a logon management method of a control device as claimed in claim 12.

Other features and advantages of the present invention will be apparent from the following description taken in conjunction with the accompanying drawings, in which like reference characters designate the same or similar parts throughout thereof.

BRIEF DESCRIPTION OF THE DRAWINGS

FIG. 12 is a diagram showing another logon GUI for a software keyboard to be displayed on an operation panel of the MFP.

DETAILED DESCRIPTION OF THE EMBODIMENTS

A logon management software application, a logon management method and a print control device according to the present embodiment enable allowing a user to log into (on) the print control device using a hardware keyboard like USB keyboard (KB).

Figure 1:
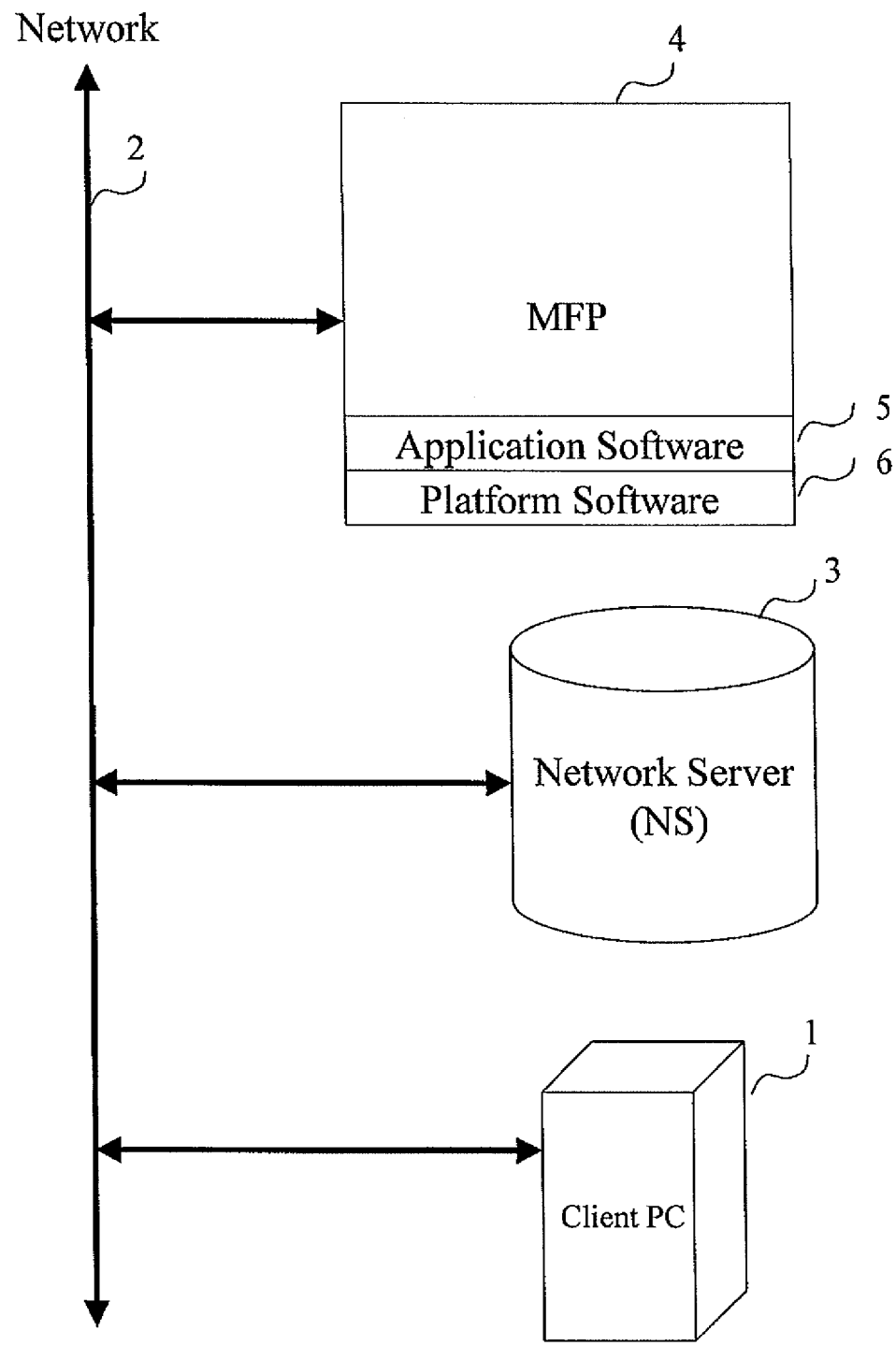
FIG. 1 illustrates the relationship between the information processing devices (client PC and Network server) and print control device (MFP) on the network according to an embodiment of the present invention.

In the following, a detailed description will be given of embodiments of the present invention with reference to the accompanying drawings. FIG. 1 illustrates the relationship between the information processing devices (personal computers like Client PC 1 and NS 3) and print control device (MFP) on the network according to an embodiment of the present invention. In FIG. 1, reference numeral 1 denotes a Client Personal Computer (information processing device) connected to network 2. Also, reference numeral 3 denotes Network Server (information processing device) connected to network 2 and includes at least domain management software to manage information (a user name and password etc.) to be used in Client PC1 and MFP4 for logging into them. Reference numeral 4 denotes MFP (print control device) that has platform software 6 and executes application software 5 based on the platform software 6. MFP 4 has a plurality of the user authentication systems for platform software 6. The user authentication systems include Default Authentication function, SDL (Simple Device Login) function and SSO (Single Sign-On) function as described in the description of the related art.

Figure 2:
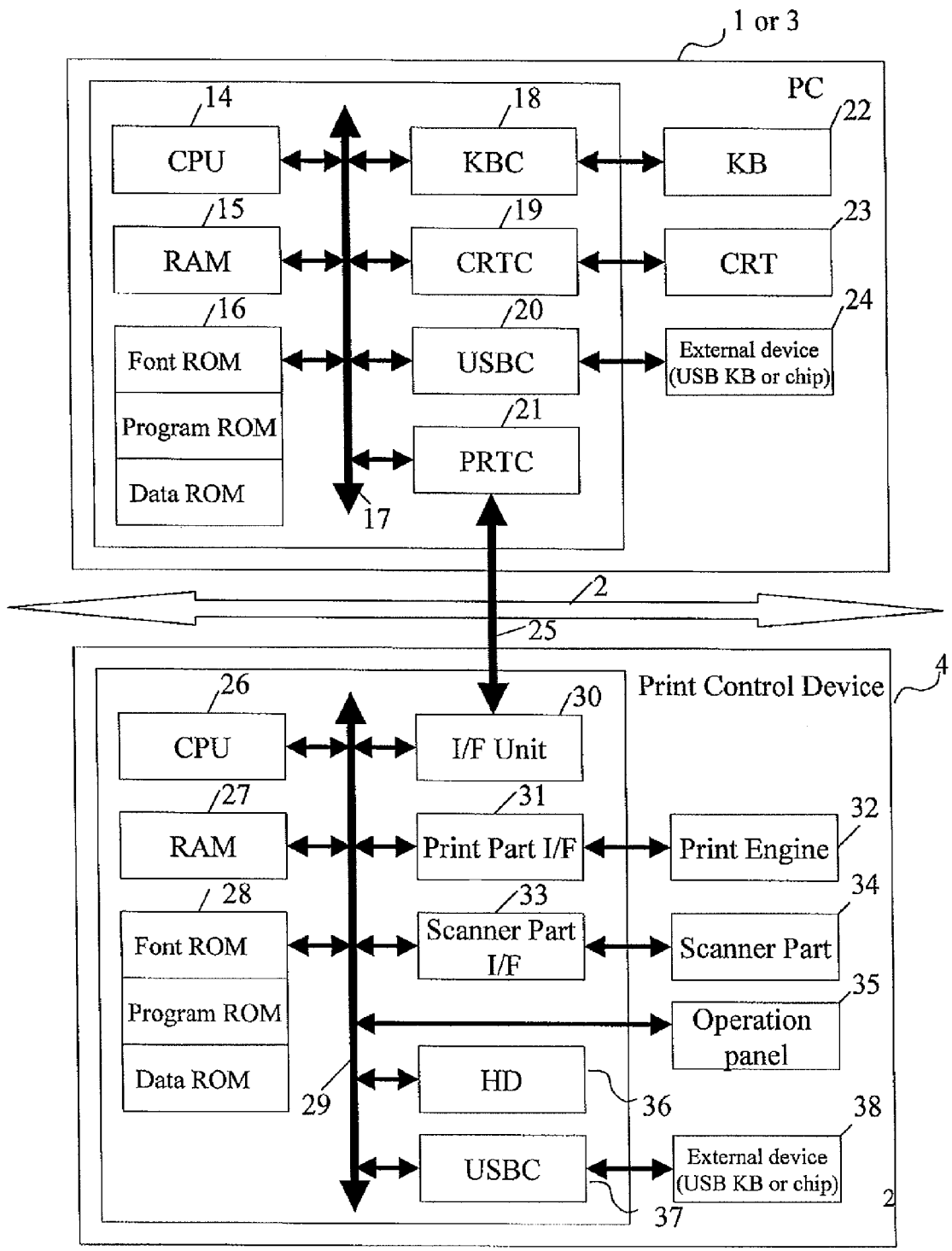
FIG. 2 is a block diagram illustrating a schematic configuration of a logon management system including one of the information processing devices according to an embodiment of the present invention.

FIG. 2 is a block diagram illustrating a schematic configuration of a logon management system including one of the information processing devices according to an embodiment of the present invention. In this regard, although a logon management system is shown as an embodiment, the present invention is not limited to this. The present invention is applied to a network system in which processing is performed by connecting through a network such as a LAN (local area network), WAN (wide area network), etc., as long as it is an environment in which the logon management software can be executed.

In FIG. 2, reference numeral 1 denotes one of personal computers (Client PC 1 and NS 3) shown in FIG. 1, and includes a CPU (central processing unit) 14 which executes processing on documents including a combination of graphics, images, characters, tables (including spreadsheets), etc., based on a document processing program, etc., stored in a program ROM of a ROM (read only memory) 16 or an external memory 24 (HD, USB chip and so on). The CPU 14 integrally controls each of the devices connected to a system bus 17. Also, the program ROM of the ROM 16 or the external device 24 (USB chip) stores an operating system (OS), which is the control program of the CPU 14 and the domain management software, etc., a font ROM of the ROM 16 or the external device 24 (USB chip) stores font data, etc., to be used for the document processing described above, and a data ROM of the ROM 16 or the external device 24 (USB ship) stores various data to be used for the above-described document processing and the domain management software, etc. Reference numeral 15 denotes a RAM (random access memory), and functions as a main memory, a work area, etc., of the CPU 14.

Reference numeral 18 is a keyboard controller (KBC), and controls the input from a normal keyboard 22 and an unillustrated pointing device. Reference numeral 19 is a CRT controller (CRTC), and controls the display of a CRT (cathode ray tube) display 23. CRTC 19 can control the display of LCDs (Liquid crystal displays). Reference numeral 20 is a USB controller (USBC), and controls the external device 24 such as a USB keyboard and USB memory chip, etc., which stores a boot program, various applications including the domain management software, font data, user files, etc.

Reference numeral 21 is a print controller (PRTC), which is connected to a print control device (MFP) 4 through a predetermined bi-directional interface (interface) 25 via the network 2, and executes communication control processing with print control device 4. In this regard, CPU 26 executes, for example, outline-font expansion (rasterization) processing into a display information RAM, which is set in RAM 27, and provides WYSIWYG (what you see is what you get) on CRT 23. Also, CPU 26 opens various registered windows like logon GUIs and a software keyboard, and executes various data processing based on the commands instructed by a touch screen on operation panel 35 or external device 38 (USB keyboard).

In print control device 4, reference numeral 26 is a CPU. CPU 26 outputs an image signal as output information to a print part (printer engine) 32 connected to a system bus 29 based on the control program, etc., stored in a program ROM of a ROM 28 or the control program, etc., stored in HD 36. Also, the program ROM of the ROM 28 stores a control program, etc., of the CPU 26. A font ROM of the ROM 28 stores font data, etc., to be used when the above-described output information is created. A data ROM of the ROM 28 stores information, etc., to be used in Client PC 1 when the print control device 4 does not have a hard disk (HD) 36, etc.

CPU 26 is capable of performing communication processing with Client PC 1 and/or NS 3 through an I/F unit 30. Reference numeral 27 is a RAM which functions as a main memory, a work area, etc., of CPU 26, and the memory capacity thereof can be expanded by an optional RAM connected to an unillustrated expansion port. In this regard, the RAM 27 is used for an output information expansion area, environment data storage area, an NVRAM (Non-Volatile RAM), etc.

Figure 3:
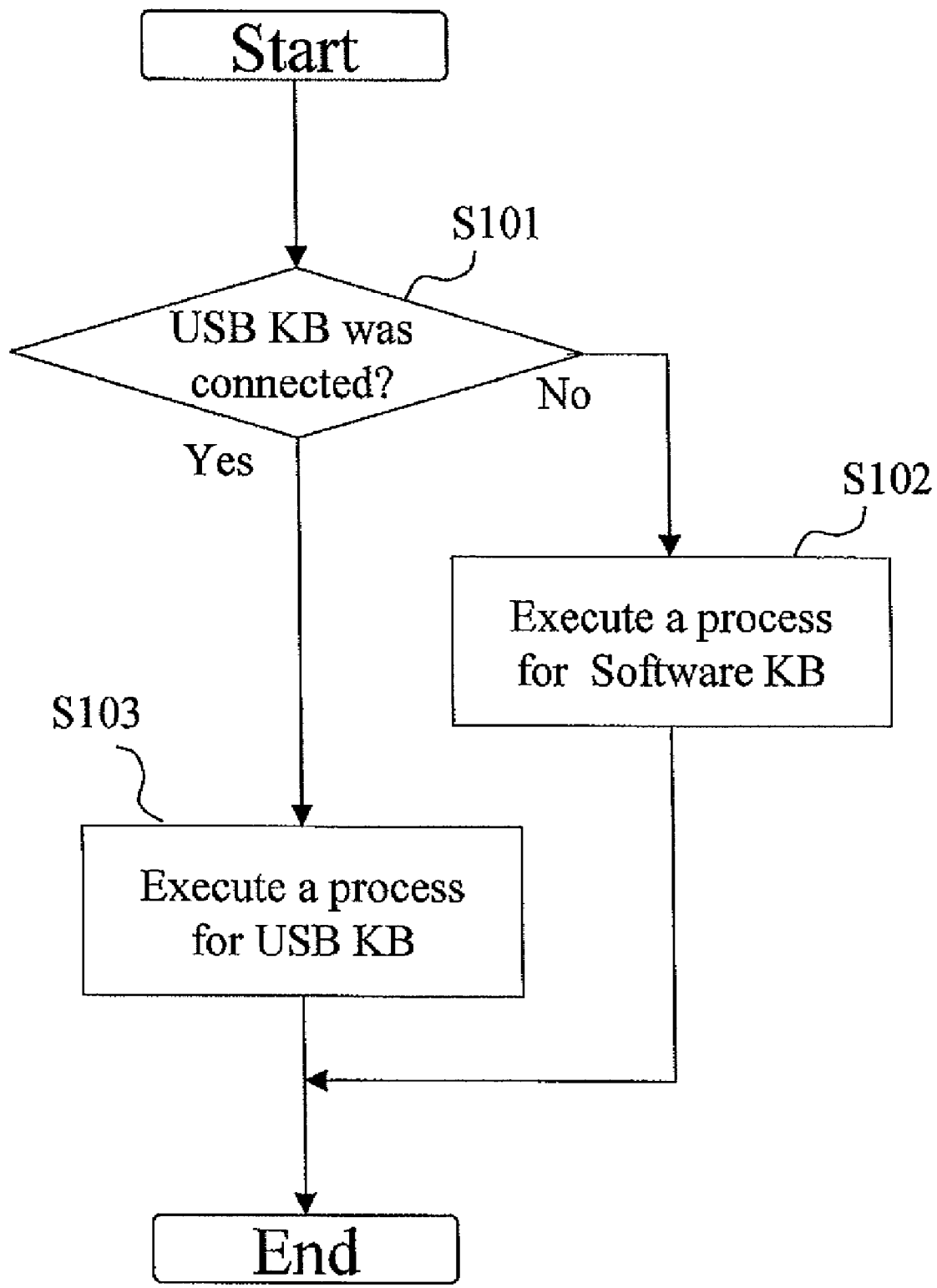
FIG. 3 is a flowchart illustrating a checking process of the logon management system to be executed in the MFP periodically.
Figure 4:
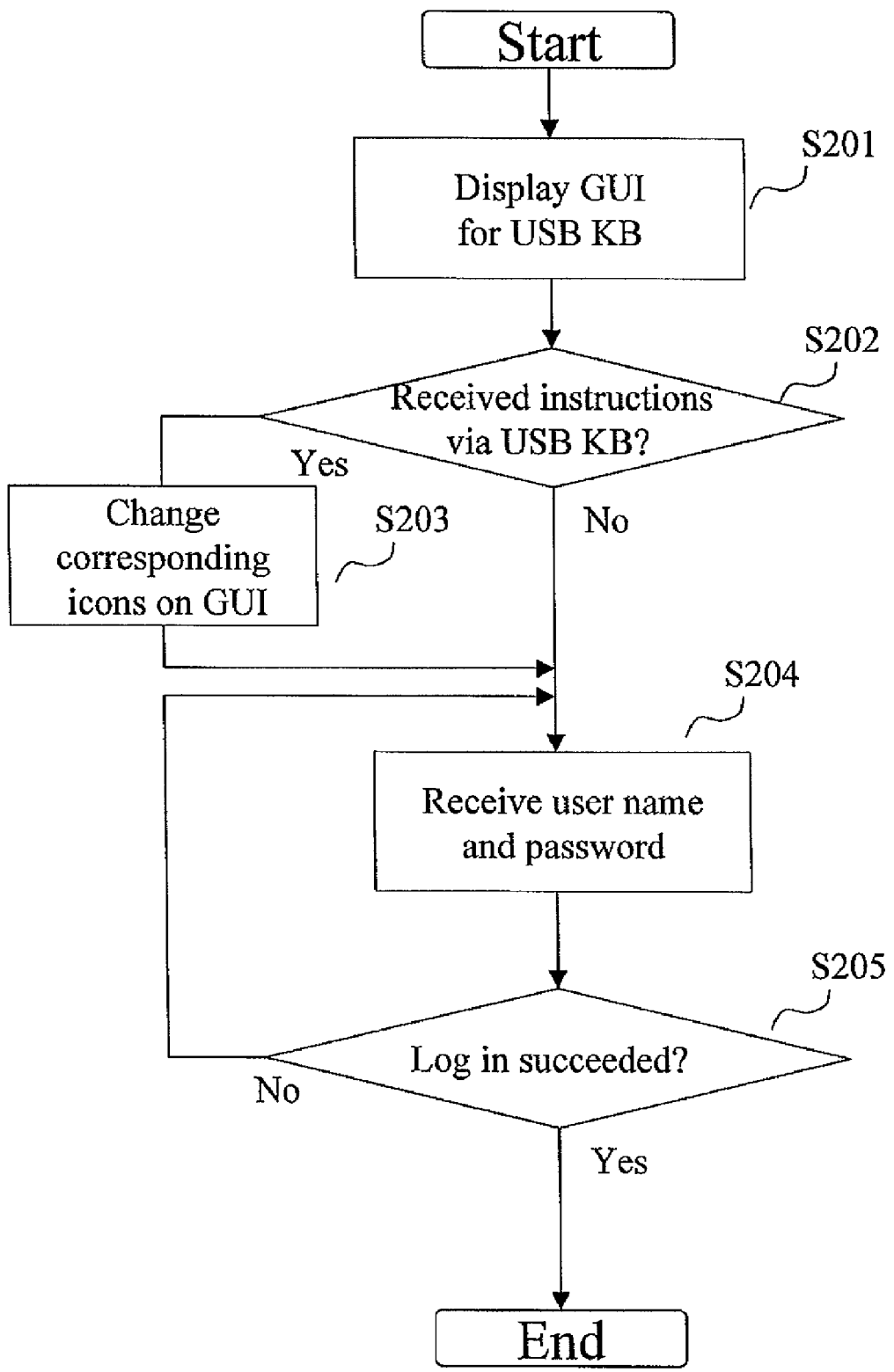
FIG. 4 is a flowchart illustrating a USB keyboard process of the logon management system to be executed in the MFP.
Figure 5:
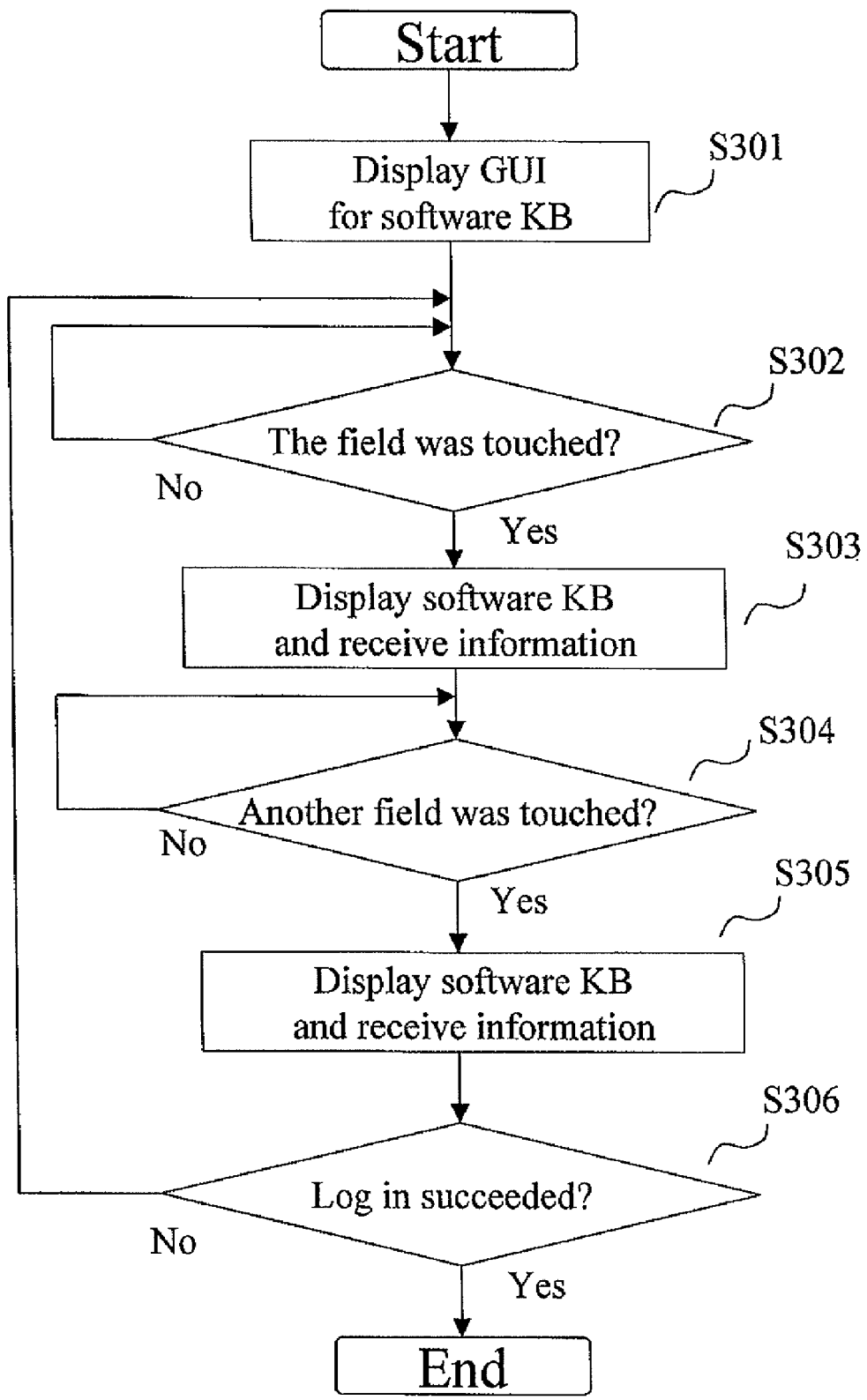
FIG. 5 is a flowchart illustrating a software keyboard process of the logon management system to be executed in the MFP.

HD 36 stores font data, an emulation program, form data, logon management software shown in FIG. 3 to 5, information related to logon GUIs and software keyboard shown in FIG. 6 to FIG. 12, etc. Reference numeral 33 is a scanner part I/F and controls documents scanned by scanner part 34 (scanner engine). The scanned document may be printed by print engine 32 and sent to Client PC 1 by using a telephone line in a facsimile mode of print control device 4. The scanned document is stored into external device 38 (USB memory chip). If a user selects documents stored in USB memory chip 38, the documents are printed by print engine 32. Also, reference numeral 35 is an operation panel (touch screen display unit) to display the logon GUIs and a software keyboard shown in FIG. 6 to FIG. 12 and receive user instructions. The operation panel also includes a key unit (small hardware unit) to enter information and instructions of the user. Reference numeral 37 is a USB controller (USBC), and controls the external device 38 such as a USB keyboard (hardware keyboard) and a USB memory chip, etc., which stores a boot program, various applications, logon management software shown in FIG. 3 to 5, font data, user files, etc.

FIG. 3 is a flowchart illustrating a checking process of the logon management system to be executed in MFP 4 (print control device). If a user powers up or boots up MFP 4, the checking process of the logon management software is executed. The checking process is executed periodically until the user powers down MFP 4 or log into MFP 4. When executing the checking process, CPU 26 determines if the USB keyboard 38 is connected to USBC 37 of MFP 4 in step 101. If No in step 101, CPU 26 executes a software keyboard process of the logon software shown in FIG. 5 in step 102. And if Yes in step 101, CPU 26 executes a hardware keyboard process of the logon software shown in FIG. 4 in step 103. And then those steps are repeated periodically until the user powers down MFP 4 or log into MFP 4. The user can connect USB keyboard 38 to MFP 4 at any time.

Figure 6:
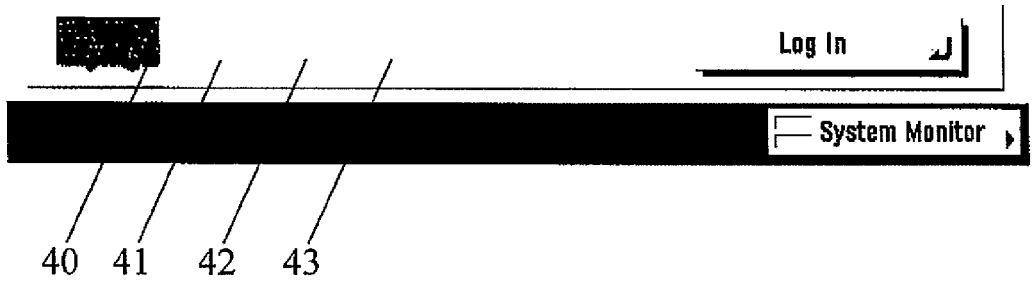
FIG. 6 is a diagram showing a logon GUI for a software keyboard to be displayed on an operation panel of the MFP.
Figure 7:
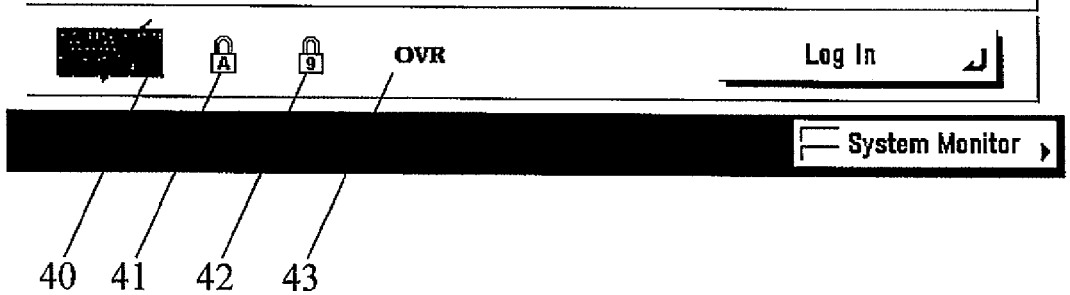
FIG. 7 is a diagram showing a logon GUI for a hardware keyboard to be displayed on an operation panel of the MFP.

FIG. 6 is a diagram showing a logon GUI for a software keyboard to be displayed on an operation panel of the MFP. In FIG. 6, the logon GUI for software keyboard has the series of four icons 40 to 43 at the bottom-left-hand corner. The purpose of the first icon 40 is to indicate the status of the USB keyboard connection. The remaining three icons 41 to 43, which are disabled in the logon GUI, are relevant only when the USB keyboard 38 is in use. Their purpose is to indicate the status of "Caps Lock" (41), "Number Lock" (42) and the "overwrite" (43) mode respectively. If USB keyboard 38 is connected to MFP 4 in step 101 and the USB keyboard 38 becomes ready for use, the relevant icon changes to that shown in FIG. 7, and the same instruction (a link) which appeared underneath the two text fields (which correspond to "User Name" and "Password") disappears. This instruction implies that the user could bring up the software keyboard by touching the associated text field (a link). It would be wrong to display this instruction since the software keyboard would be disabled when USB keyboard 38 becomes ready for use. It should be noted that touching any of the text field will still give that field the input focus, but it would not cause the software keyboard to appear. FIG. 7 is a diagram showing a logon GUI for a hardware keyboard to be displayed on an operation panel of the MFP. FIG. 7 also shows the icons 41 to 43 for enabled "Caps Lock", "Number Lock" and the "overwrite" mode instructed by USB keyboard 38. If the USB keyboard is disconnected at any point, statuses of all the four icons change back to those shown in FIG. 6 and the instruction underneath the two text fields reappear.

FIG. 4 is a flowchart illustrating a USB keyboard process of logon management system to be executed in MFP 4. In case that a connection of USB keyboard 38 is detected in step 101, CPU 26 displays a logon GUI for a hardware keyboard shown in FIG. 7 on operation panel 35 in step 201. CPU 26 determines if instructions are received from USB keyboard 38 regarding "Caps Lock" (41), "Number Lock" (42) and the "overwrite" (43) mode. If yes in step 202, CPU 26 changes corresponding icons to the icons indicating disabled mode or the icons indicating enabled mode based on the instructions in step 203. If No in step 202, CPU 26 receives at least user name and password that the user enters into a log on GUI for a hardware keyboard shown in FIG. 8. When the user selects "login button" at the bottom-right-hand corner on the logon GUI, CPU 26 checks the user name and password with network server 3 and determines if the login is succeeded in step 205. The network server 3 is always managing the user name and password. If No in step 205, CPU 26 repeats the steps from step 204. If yes in step 205, this process ends.

FIG. 5 is a flowchart illustrating a software keyboard process of logon management system to be executed in MFP 4. In case that a connection of USB keyboard 38 is not detected in step 101, CPU 26 displays a logon GUI for a software keyboard shown in FIG. 6 on operation panel 35 in step 301. CPU 26 determines if any of one of the text fields (for the user name and the password) in the logon GUI was touched by the user in step 302. If yes in step 302, CPU 26 displays a software keyboard shown in FIG. 9 on the operation panel 35 and receives information like at least a user name and password that the user enters into the field of the logon GUI. After the user selects "OK button" at the bottom-right-hand corner on the software keyboard, CPU 26 displays the logon GUI for software keyboard shown in FIG. 6 again. And then CPU 26 determines if any of remaining text field was touched by the user in step 304. If yes in step 304, CPU 26 displays a software keyboard shown in FIG. 9 on the operation panel 35 and receives information like at least a user name and password that the user enters into the field of the logon GUI. After the user selects "OK button" at the bottom-right-hand corner on the software keyboard, CPU 26 displays the logon GUI for software keyboard shown in FIG. 6 again. And then when the user selects "login button" at the bottom-right-hand corner on the logon GUI, CPU 26 checks the user name and password with network server 3 and determines if the login is succeeded in step 306. The network server 3 is always managing the user name and password. If No in step 306, CPU 26 repeats the steps from step 302. If yes in step 306, this process ends.

Figure 8:
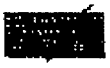
FIG. 8 is a diagram showing another logon GUI for a hardware keyboard to be displayed on an operation panel of the MFP.
Figure 9:
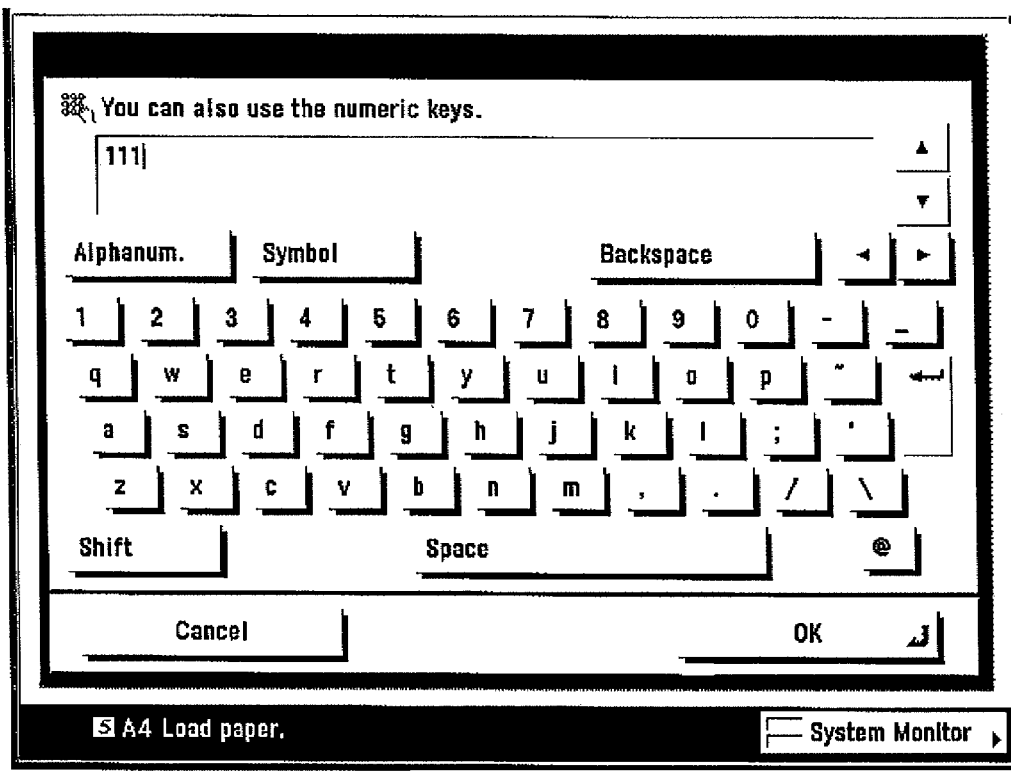
FIG. 9 is a diagram showing a software keyboard to be displayed on an operation panel of the MFP.
Figure 10:
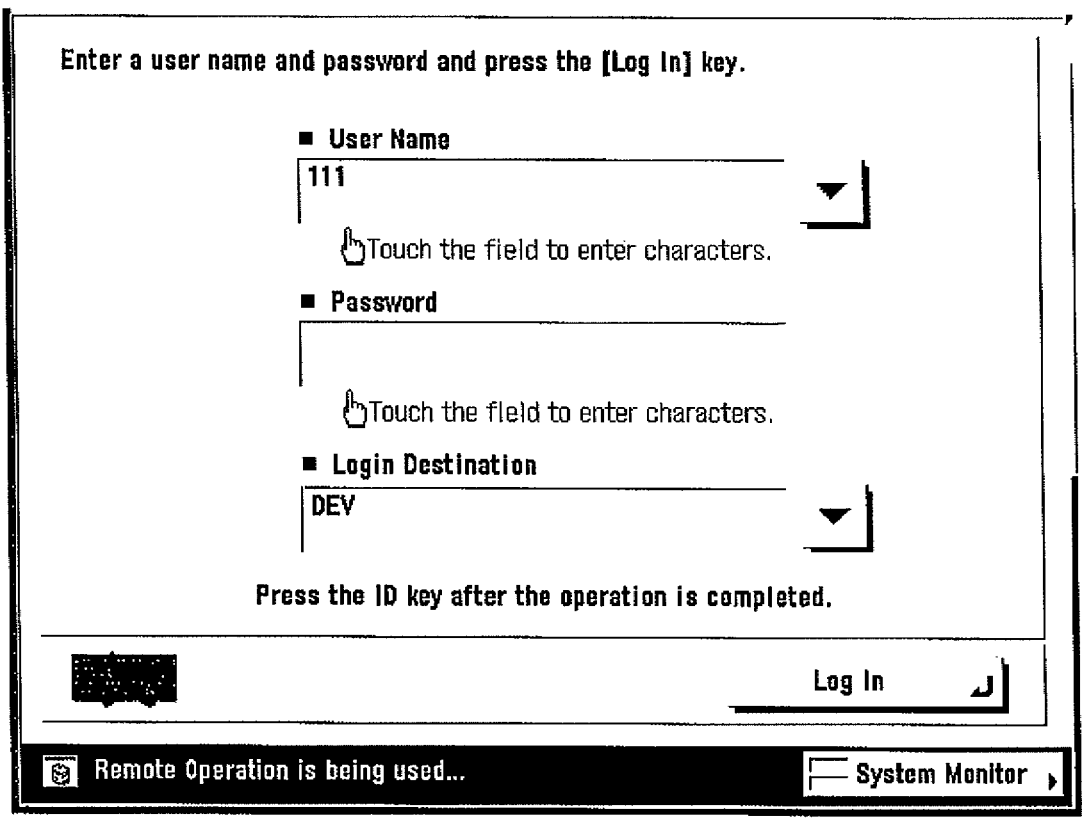
FIG. 10 is a diagram showing another logon GUI for a software keyboard to be displayed on an operation panel of the MFP.
Figure 11:
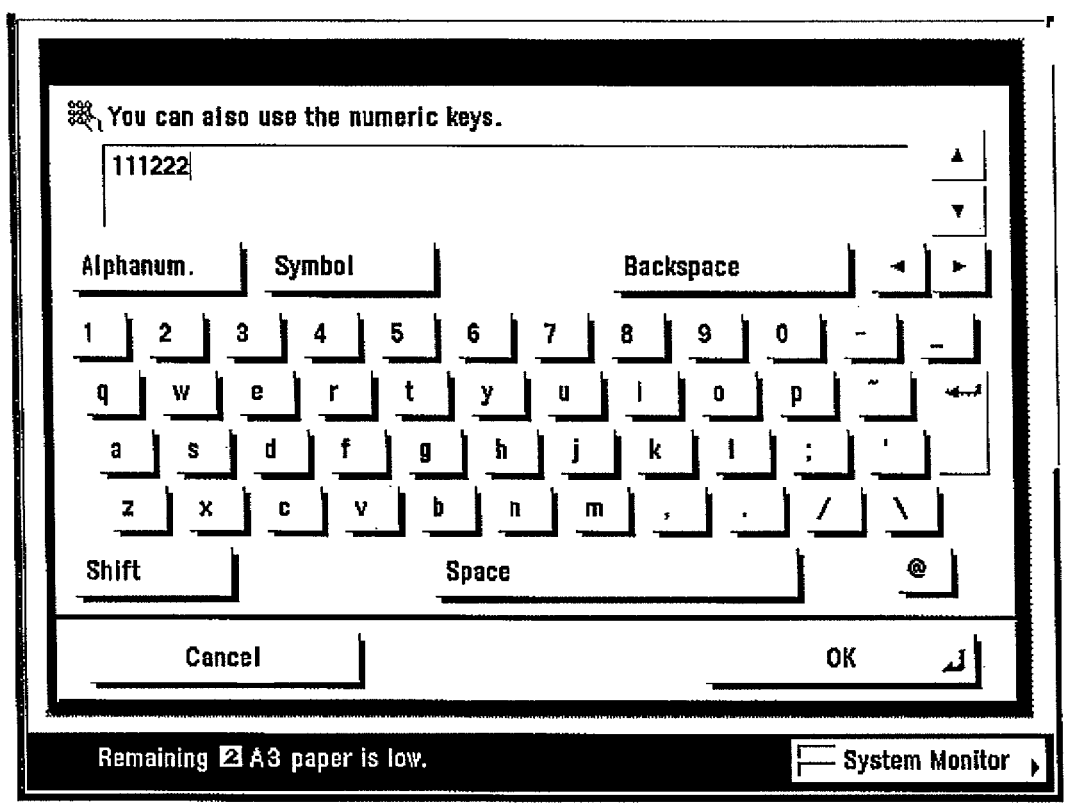
FIG. 11 is a diagram showing another software keyboard to be displayed on an operation panel of the MFP.

In the above-described embodiment, after the user enters some part of the information into the text field using the logon GUI for a hardware keyboard shown in FIG. 8, the user can disconnect the USB keyboard 38 from MFP 4 in order to connect USB memory chip to MFP 4. At this time, CPU 26 detected that USB keyboard 38 was disconnected from MFP 4 and displays a logon GUI for a software keyboard shown in FIG. 10 keeping the part of the information (111) that the user has already entered in to the logon GUI for a hardware keyboard. If CPU 26 determines that the user touched the text field (for user name) including the part of the information, CPU 26 displays a software keyboard shown in FIG. 11 on the operation panel 35 so that user continue to enter remaining part of the information. After the user selects "OK button" at the bottom-right-hand corner on the software keyboard, CPU 26 displays a logon GUI for software keyboard shown in FIG. 12 so that the user enter another information into remaining text field in the same manner. And then when the user selects "login button" at the bottom-right-hand corner on the logon GUI, CPU 26 checks the information with network server 3 and determines if the login is succeeded. The information (ex. 111222) is generated by combining the part of the information (ex. 111) entered into the logon GUI for a hardware keyboard and the remaining part of the information (ex. 222) entered into the logon GUI for a software keyboard. The network server 3 is always managing the information like a user name and password. Also, after the user enters some part of the information into the text field using the logon GUI for a software keyboard, the user can connect the USB keyboard 38 to MFP 4. In a same manner, the user can continue to enter the remaining part of the information and log on MFP 4 using the combined information. MFP 4 can change the logon GUI from the logon GUI for software keyboard to the logon GUI for hardware keyboard or from the logon GUI for hardware keyboard to the logon GUI for software keyboard based on a connection of USB keyboard 38 at any time. Therefore the user can continue to enter the information even though the GUI was changed. Also the information to logon MFP 4 can be one of the user name and password.

Also, in the above-described embodiment, various functions are achieved by reading the programs for achieving the functions in Client PC 1, NS 3 or MFP 4 into the memory (RAM) and the CPU executing these functions. However, the invention is not limited to this, and all of the processing or part of the functions may be achieved by dedicated hardware. Also, the above-described memory may be constituted by a non-volatile memory such as a magnetic optical disk unit, a flash memory, etc., a read-only recording medium such as a CD-ROM, etc., a volatile memory other than a RAM, or a computer-readable and writable recording medium by the combination of these.

Also, a program for achieving various processing functions in Client PC 1, NS 3, MFP 4 may be recorded into a computer-readable recording medium, and the program code recorded in the recording medium may be read into a computer system, and each processing may be performed by executing the program code. In this regard, a "computer system" mentioned here includes an OS, hardware such as a peripheral device, etc.

Also, a "computer-readable recording medium" means a portable medium such as a flexible disk, a magnetic optical disk, a ROM, a CD-ROM, etc., and a storage device such as a hard disk contained in a computer system. Furthermore, a "computer-readable recording medium" includes a device for holding a program for a certain period of time such as an internal volatile memory (RAM) of a computer system to be a server or a client when the program is transmitted through a network such as the Internet, etc., and a communication line such as a telephone line, etc.

Also, the above-described program may be transmitted from a computer system storing the program in a storage device, etc., through a transmission medium, or may be transmitted to another computer system by a transmitted wave in the transmission medium. Here, a "transmission medium" for transmitting the program means a medium having an information transmission function such as a network (communication network), for example, the Internet, etc., and the communication line such as a telephone line, etc. Also, the above-described program may achieve part of the above-described functions. Furthermore, the program may achieve the above-described functions by combining with the program that is already recorded in a computer system, that is to say, the program may be a differential file (differential program).

Also, a program product such as a computer-readable recording medium which records the above-described program may be applied to an embodiment of the present invention. The above-described program, recording medium, a transmission medium, and the program product are included in the scope of the present invention. As described above, a detailed description has been given of the embodiments of the present invention with reference to the drawings. However, a specific structure is not limited to the embodiments, and a design, etc., are included within the spirit and scope of the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application is a National Stage filing of PCT application No PCT/EP2006/065810 filed on Aug. 30, 2006 which claims priority from Great Britain Patent Application No. 0517708.4 filed on Aug. 31, 2005 in Great Britain, all of which are hereby incorporated by reference herein in their entirety.

The invention claimed is:

1. A logon management software application embodied in a control device connectable to an information processing device, wherein the software application is arranged such that when executed it performs:

detecting if a hardware keyboard is connected to the control device during a logon process;

displaying on a display of the control device a first logon GUI for using the connected hardware keyboard to enter information into a field on the first logon GUI if the connection of the hardware keyboard is detected;

displaying on the display of the control device a second logon GUI including a field to enter the information, different to the first logon GUI, if the connection of the hardware keyboard is not detected, wherein the second logon GUI has a selectable link to display a software keyboard on the display; and controlling a logon of the control device based on the information entered:

into the first logon GUI by the hardware keyboard if the connection of the hardware keyboard is detected throughout the logon process, into the second logon GUI by the software keyboard to be displayed on the display if the connection of the hardware keyboard is not detected during the logon process, if the connection of the hardware keyboard is detected during a part of the logon process, into the first logon GUI by the hardware keyboard during said part of the logon process, and into the second logon GUI by the software keyboard to be displayed on the display during the other part of the logon process.

2. A software application according to claim 1, wherein the first and second logon GUIs include an icon indicating the connection of the hardware keyboard.

3. A software application according to claim 1, wherein the first and second logon GUIs include an icon indicating a status of the hardware keyboard.

4. A software application according to claim 1, wherein the information is password and/or username to logon the control device.

5. A software application according to claim 1, wherein the first or second logon GUI is displayed on the display after system boot-up or power-up.

6. A software application according to claim 1, wherein the hardware keyboard is a USB keyboard.

7. A software application according to claim 1, wherein the logon management software application is stored in a memory medium.

8. A software application according to claim 1, wherein the information is managed by the information processing device.

9. A control device, connectable to an information processing device, and comprising a controller and a display, wherein the control device comprises:

a detecting unit configured to detect if a hardware keyboard is connected to the control device during a logon process;

and the controller is arranged to:

display a first logon GUI on the display for using the connected hardware keyboard to enter information into a field on the first logon GUI if the connection of the hardware keyboard is detected by the detecting unit;

display a second logon GUI including a field to enter the information, different to the first logon GUI, on the display if the connection of the hardware keyboard is not detected by the detecting unit, wherein the second logon GUI has a selectable link to display a software keyboard on the display; and control a logon of the control device based on the information entered:

into the first logon GUI by the hardware keyboard if the connection of the hardware keyboard is detected throughout the logon process, into the second logon GUI by the software keyboard to be displayed on the display if the connection of the hardware keyboard is not detected during the logon process, if the connection of the hardware keyboard is detected during a part of the logon process, into the first logon GUI by the hardware keyboard during said part of the logon process, and into the second logon GUI by the software keyboard to be displayed on the display during the other part of the logon process.

10. A logon management method of a control device connectable to an information processing device, wherein the method comprises:
    detecting if a hardware keyboard is connected to the control device during a logon process;
    displaying on a display of the control device a first logon GUI for using the connected hardware keyboard to enter information into a field on the first logon GUI if the connection of the hardware keyboard is detected;
    displaying a second logon GUI including a field to enter the information, different to the first logon GUI, on the display of the control device if the connection of the hardware keyboard is not detected, wherein the second logon GUI has a selectable link to display a software keyboard on the display; and
    controlling a logon of the control device based on the information entered:
        into the first logon GUI by the hardware keyboard if the connection of the hardware keyboard is detected throughout the logon process,
        into the second logon GUI by the software keyboard to be displayed on the display if the connection of the hardware keyboard is not detected during the logon process,
        if the connection of the hardware keyboard is detected during a part of the logon process, into the first logon GUI by the hardware keyboard during said part of the logon process, and into the second logon GUI by the software keyboard to be displayed on the display during the other part of the logon process.

11. A non-transitory computer-readable storage medium storing a logon management software application executable by a control device, the control device connectable to an information processing device, wherein the software application is arranged such that when executed it performs:
    detecting if a hardware keyboard is connected to the control device during a logon process;
    displaying on a display of the control device a first logon GUI for using the connected hardware keyboard to enter information into a field on the first logon GUI if the connection of the hardware keyboard is detected;
    displaying on the display of the control device a second logon GUI including a field to enter the information, different to the first logon GUI, if the connection of the hardware keyboard is not detected, wherein the second logon GUI has a selectable link to display a software keyboard on the display; and
    controlling a logon of the control device based on the information entered:
        into the first logon GUI by the hardware keyboard if the connection of the hardware keyboard is detected throughout the logon process,
        into the second logon GUI by the software keyboard to be displayed on the display if the connection of the hardware keyboard is not detected during the logon process,
        if the connection of the hardware keyboard is detected during a part of the logon process, into the first logon GUI by the hardware keyboard during said part of the logon process, and into the second logon GUI by the software keyboard to be displayed on the display during the other part of the logon process.

* * * * *